United States Patent [19]
Kondo

[11] Patent Number: 5,703,649
[45] Date of Patent: Dec. 30, 1997

[54] DIGITAL VIDEO SIGNAL CODING APPARATUS AND METHOD, AND CODED VIDEO SIGNAL DECODING APPARATUS AND METHOD

[75] Inventor: Tetsujiro Kondo, Kanagawa, Japan

[73] Assignee: Sony Corporation, Tokyo, Japan

[21] Appl. No.: 706,612

[22] Filed: Sep. 5, 1996

[30] Foreign Application Priority Data

Sep. 8, 1995 [JP] Japan ................... 7-257077

[51] Int. Cl.⁶ ........................................ H04N 7/32
[52] U.S. Cl. ............................. 348/408; 348/416
[58] Field of Search ........................ 348/408, 409, 348/412, 413, 415, 416; 382/236, 240, 238

[56] References Cited

U.S. PATENT DOCUMENTS 4,849,810   7/1989   Ericsson ................... 348/416
5,436,665   7/1995   Ueno et al. ............... 348/413
5,557,341   9/1996   Weiss et al. .............. 348/415

*Primary Examiner*—Amelia Au
*Attorney, Agent, or Firm*—William S. Frommer; Alvin Sinderbrand

[57] ABSTRACT

In a digital video coding apparatus, the image compression rate can be improved and the worsening of image quality can be decreased. As well as conducting the motion compensated prediction, the predictive residue at this point is obtained, and in addition to the above, as well as conducting the prediction processing among hierarchical images by using the hierarchical image, the predictive residue at this point is obtained, and the predictive residue according to the motion compensated prediction and the predictive residue according to the hierarchical prediction are adaptively selected and combined and this selected or combined predictive residue is encoded.

17 Claims, 9 Drawing Sheets

DIGITAL VIDEO SIGNAL CODING APPARATUS AND METHOD, AND CODED VIDEO SIGNAL DECODING APPARATUS AND METHOD

BACKGROUND OF THE INVENTION

1. Field of the Invention

This invention relates to a digital video signal coding apparatus and method, and coded video signal decoding apparatus and method, and more particularly, is suitably applied to a signal transmission device for compression-coding and transmitting a video signal and for receiving this, and to a recording/reproducing device for compression-coding a video signal and recording this in a recording medium and for expansion-decoding and reproducing this.

2. Description of the Related Art

Heretofore, in a video signal transmission system for transmitting video signals to a remote location such as a television conference system, and a device for digitalizing the video signals and recording and reproducing these on a video tape recorder and video disc recorder, in order to utilize the transmission paths and recording medium effectively, the meaningful information has been efficiently encoded using the correlation of digitalized video signals, and thus the volume of transmitting information and the volume of the recording information have been decreased and the transmission efficiency and recording efficiency have been increased.

In general, since a video signal includes many redundant elements in the space and time directions, it is necessary to remove these redundant elements in order to realize high efficient compression. Accordingly, in general, by performing a predictive coding processing to the image data to be transmitted or recorded, the redundant elements in the space and time directions are effectively removed. As the predictive coding method which is capable of effectively removing the redundant elements in the time direction, there is a motion compensated prediction.

In the motion compensated prediction, the motion vector of an object is detected considering that the prediction error increases in the part moving on the screen as compared with the part at rest, and encodes the differential value (residue) between the previous frame image and the current frame image motion-compensated for this motion vector.

However, in the motion compensated prediction coding, regarding the image having no correlation to the previous frame, such as represented by scene change, motion compensation must be off operated (e.g., must be set to intra-mode); and in such a case, data cannot be compressed. Also, in general, since the motion compensation is conducted per macro-block, the image quality becomes worse at the block borders. Moreover, in case of motion-detecting at the plane part, detection error easily occurs due to noise and as a result, it has created a problem with the compression efficiency decreasing.

SUMMARY OF THE INVENTION

In view of the foregoing, an object of this invention is to provide a digital video signal coding apparatus and method, and a coded video signal decoding apparatus and method in which the compression efficiency can be improved and the worsening of image quality can be decreased.

The foregoing object and other objects of the invention have been achieved by the provision of a digital video signal coding apparatus and method, and a coded video signal decoding apparatus and method in which the motion compensated prediction is executed and the predictive residue at this time is, and moreover, the prediction processing is executed among hierarchical images by using hierarchical images and the predictive residue at this point is obtained. Then, the predictive residue according to the motion compensated prediction and the predictive residue according to the intra hierarchical prediction are adaptively selected or combined, and this selected or combined predictive residue is transmitted.

With this arrangement, at the part such as an edge part where high efficient motion detection can be conducted, the motion compensated prediction means will be selected, but on the other hand, at the part such as the plane part having low motion detection efficiency, the hierarchy prediction means will be selected.

FIG. 1 shows a theory of the digital video signal coding method according to the present invention. In the present invention, as a preparation stage, the upper hierarchical data having low resolution is formed from the lower hierarchical data having high resolution corresponding to an inputted image data. And in addition to conducting the prediction in the time direction among frames of lower hierarchy having different times each other (motion compensated prediction), the lower hierarchy is predicted from the upper hierarchy (hereinafter, referred to as space hierarchical direction prediction). By adaptively using the prediction result, the compression efficiency can be improved and the worsening of image quality by compression can be decreased.

Now, a case of conducting the motion compensated prediction and the space hierarchical direction prediction in parallel and a case of conducting these in series will be proposed. In the case of performing the parallel process, each prediction processing is weighted and encoded according to the probability of two predictions guessing right. More specifically, two prediction values are weighted using the weight coefficients $\omega 1$ and $\omega 2$ and by transmitting these to the decoder side, the decoder side can reconstruct the image almost identical to the original image. Then, the coding device transmits the optimal weight coefficients $\omega 1$ and $\omega 2$ obtained in advance based on the predictive residue in addition to the two predictive residues weighted and upper hierarchical data and the motion vector. Moreover, by selecting the weight coefficients $\omega 1$ and $\omega 2$ to become $\omega 1 + \omega 2 =$ constant, only one of weight coefficients is transmitted.

In the decoder side, firstly a prediction value Ps in the space hierarchical direction is obtained by using the transmitted upper hierarchical data and a prediction value Pt according to the motion compensated prediction is obtained by using the transmitted motion vector.

Then, using these prediction values Ps and Pt, a prediction value P is obtained by the following equation (1):

$$p = \omega 1 \times Pt + \omega 2 \times Ps \ (\because \omega 1 + \omega 2 = 1) \tag{1}$$

At this point, $\omega 1$ and $\omega 2$ are weight coefficients. Then, by adding the predictive residue, which is weight-added, to be transmitted from the coding device to the obtained prediction value P, the decoded pixel value is obtained.

At this point, two kinds of methods as the methods will be proposed to determine the weight coefficients $\omega 1$ and $\omega 2$. The first method is the method to select alternatively either one of prediction methods by making the weight coefficient for the prediction having smaller residue to be "1" and the weight coefficient for the prediction having larger residue to be "0".

The second method is the method to obtain the weight coefficients ω1 and ω2 by the proportional allotment in accordance with the predictive residues of 2 prediction methods (i.e., motion compensated prediction and space hierarchical direction prediction). More specifically, by using the predictive residue Rt in the motion compensated prediction and the predictive residue Rs in the space hierarchical direction prediction and raising to the second power approximation, Qt and Qs are calculated as shown in the following equation (2):

$$Qt = E[Rt^2] \quad Qs = E[Rs^2] \quad (2)$$

E [ ] shows an average calculation. And by using these Qt and Qs, the weight coefficients ω1 and ω2 are obtained as the following equation (3):

$$\omega 1 = \frac{Qs}{Qt + Qs} \quad (3)$$
$$\omega 2 = \frac{Qt}{Qt + Qs}$$

Furthermore, as the method to execute the motion compensated prediction and space hierarchical prediction in series, it is proposed as the first method that the prediction value is obtained by either one of prediction methods at the initial stage and then by using that prediction residue the prediction processing is conducted by the other prediction processing at the next stage. Moreover, as the second method, it is proposed that basically the double predictions are executed in series similar to that of the first method, but if the prediction residue is lower than the fixed threshold at the initial stage, the prediction at the next stage is stopped, and only when the prediction residue is larger than the fixed threshold, the prediction is continued at the later stage.

In the digital video signal coding method according to the present invention, by using the prediction method in the time direction and the prediction method in the space hierarchical direction which are two completely different prediction methods, in the case where either one of prediction residues becomes larger, the other prediction method can compensate the other method. Thus, the compression coding having high compressibility and less worsening of picture quality can be achieved.

At this point, the space hierarchical direction prediction will be described. In the space hierarchical direction prediction, as shown in FIG. 2, such as taking an arithmetic average as shown in the following equation (2) on four pixels x1, x2, x3 and x4 in a small block of 2 lines×2 pixels at the lower hierarchy, the upper hierarchy with decreased pixel numbers is formed by making the value m1 as the value of upper hierarchy.

$$m1 = (x1 + x2 + x3 + x4)/4 \quad (4)$$

Then, the pixel value of the lower hierarchy is predicted by using the pixel value "m" of the upper hierarchy. For example, using three neighboring pixels m0, m1 and m2 of the upper hierarchy, the prediction values Px1 to Px4 for x1 to x4 are obtained as following equation (5):

$$Px1 = w1Am0 + w2Am1 + w3Am2 \quad Px2 = w1Bm0 + w2Bm1 + w3Bm2 \quad Px3 = w1Cm0 + w2Cm1 + w3Cm2 \quad Px4 = w1Dm0 + w2Dm1 + w2Dm2 \quad (5)$$

"w" shows a weight coefficient. Accordingly, in the space hierarchical direction prediction, by recurrently predicting the pixel value of the lower hierarchy from the pixels of the upper hierarchy formed once, the lower hierarchy pixel can be predicted in utilizing the upper hierarchy pixels covering wide range, a satisfactory prediction result can be obtained at the plane part of an image for example.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) First Embodiment

Figure 3:
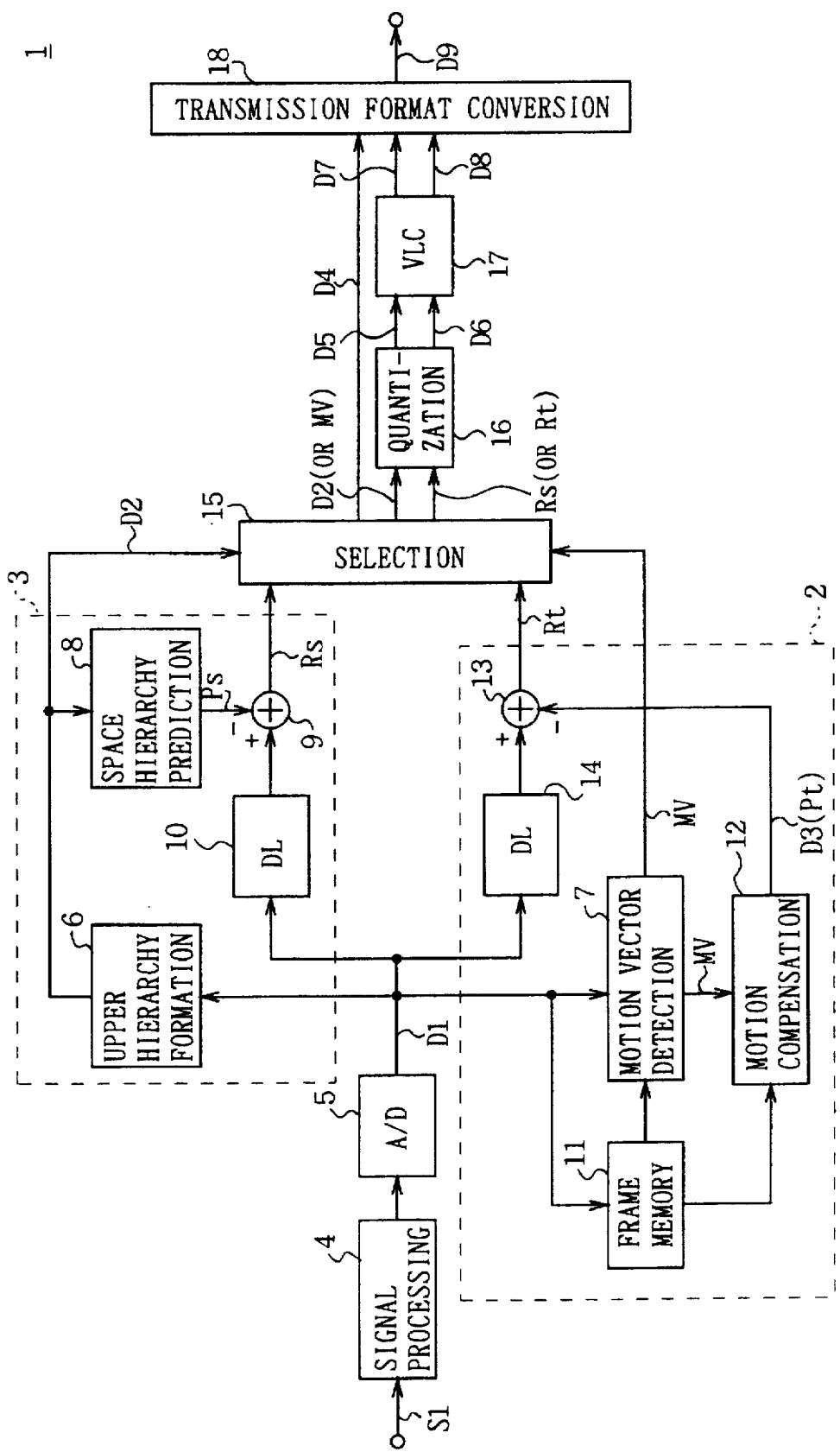
FIG. 3 is a block diagram showing the construction of a coding device according to the first embodiment.

In FIG. 3, 1 shows a digital video coding apparatus (hereinafter referred to merely as a coding device) according to the first embodiment as a whole, the coding device 1 has a motion compensated prediction unit 2 and a space hierarchical direction prediction unit 3. The coding device i of this embodiment compares the sizes of predictive residue by the motion compensated prediction unit 2 and of predictive residue by the space hierarchical direction prediction unit 3, and encodes and transmits only the smaller predictive residue.

Figure 1:
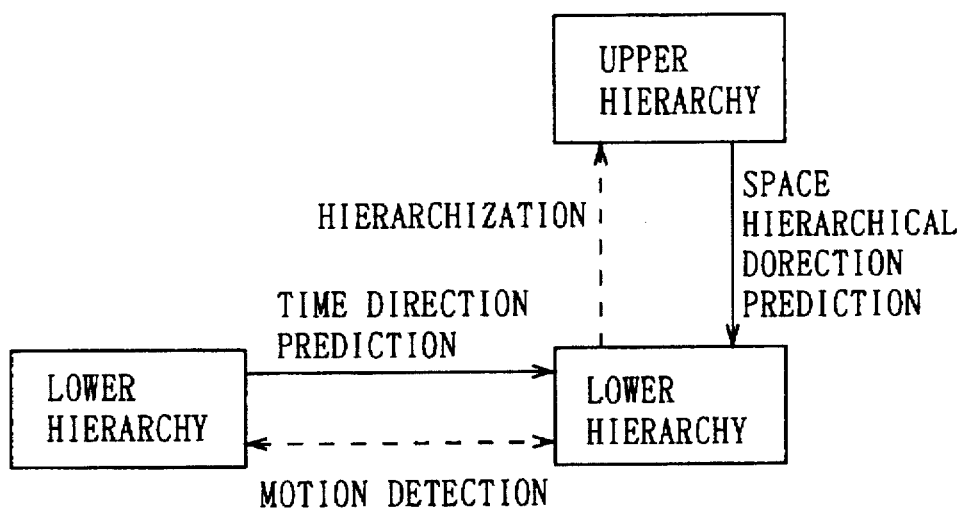
FIG. 1 is a brief linear diagram illustrating a digital video signal coding method theory according to the present invention.
Figure 2:
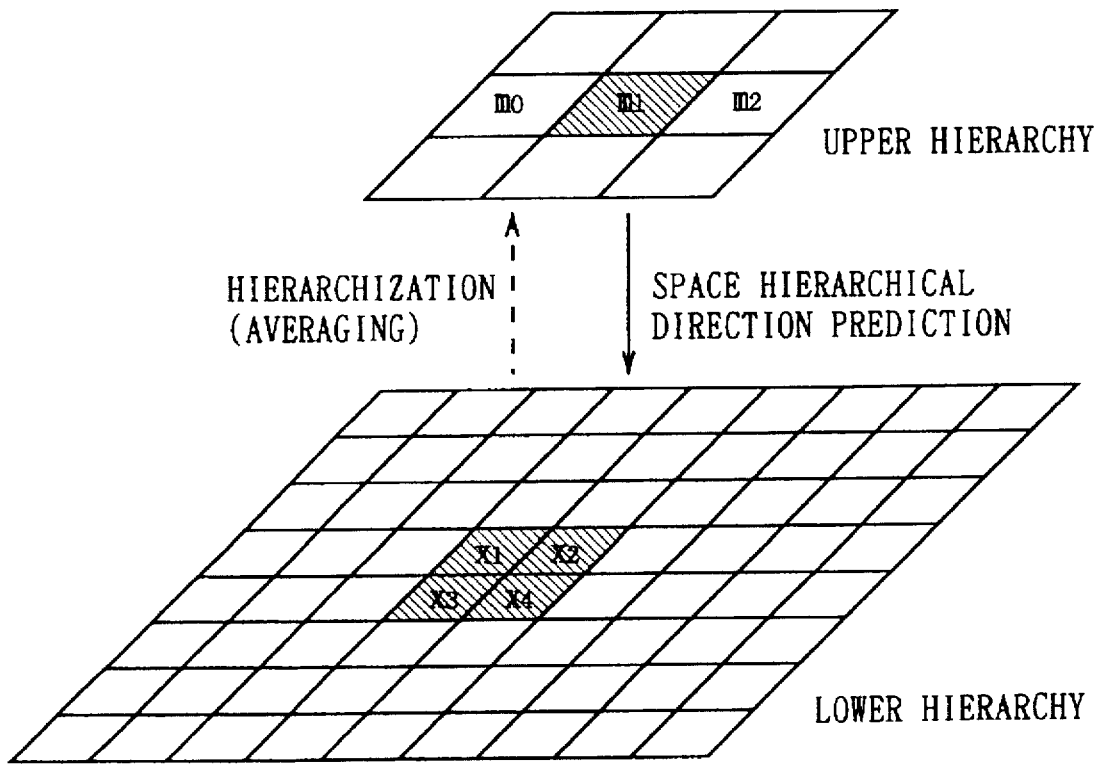
FIG. 2 is a schematic diagram illustrating the hierarchization of an image and space hierarchical direction prediction.

After performing the pre-processing on an input video signal S1 by a signal processing circuit 4, such as band limiting to the fixed signal band, the coding device 1 supplies the signal S1 to an upper hierarchy forming circuit 6 and a motion vector detection circuit 7 through an analog-to-digital converter (A/D) 5. The upper hierarchy forming circuit 6, as described above in FIG. 2, forms the upper hierarchical image data D2 by performing an averaging calculation using the input image data D1 as the lower hierarchical data and outputs this to a space hierarchy prediction circuit 8.

As described above, the space hierarchy prediction circuit 8 obtains the predictive pixel value Ps of the lower hierarchy by using the upper hierarchical image data D2 and supplies the predictive pixel value Ps to a differential circuit 9. Moreover, the input image data D1 delayed for the processing of the upper hierarchy forming circuit 6 and space hierarchy prediction circuit 8 is supplied to the differential circuit 9 by the delay circuit (DL) 10. With this arrangement, in the differential circuit 9, the differential calculation between the predictive pixel value Ps and the corresponding true value is performed, so that the predictive residue data Rs on each pixel is calculated.

The motion vector detection circuit 7 detects the motion vector MV per macro block by means of block matching method, by using the current frame image data to be directly inputted from the analog-to-digital converter 5 and the previous frame image data stored in the frame memory 11, and outputs this to the motion compensation circuit 12.

The motion compensation circuit 12 forms a motion compensated image data D3 (Pt) by operating the previous frame data read out from the frame memory 11 per macro block on the basis of the motion vector MV and supplies this to the differential circuit 13. Moreover, the input image data D1 delayed for the processing of the motion vector detection circuit 7 and the motion compensation circuit 12 is supplied to the differential circuit 13 by the delay circuit (DL) 14. Thus, in the differential circuit 13, the differential calculation between the predictive pixel value Pt by the motion compensation and the corresponding true value is performed, so that the predictive residue data Rt on each pixel is calculated.

Thus obtained predictive residue data Rs according to the space hierarchical direction prediction and the predictive residue data Rt according to the motion compensated prediction are supplied to the selection circuit 15. Moreover, the upper hierarchical image data D2 and the motion vector MV are supplied to the selection circuit 15. The selection circuit 15 compares an absolute value sum, a square sum or the maximum residue among each predictive residue data in each block in case of gathering and blocking a plurality of each predictive residue data Rs and Rt in order to alternatively select one having smaller value.

More specifically, in the case where the predictive residue according to the space hierarchical prediction is smaller, the predictive residue data Rs and the upper hierarchical image data D2 are outputted to a quantization circuit 16. On the other hand, if the predictive residue according to the motion compensated prediction is smaller, the predictive residue data Rt and the motion vector MV are supplied to the quantization circuit 16. Here, an alternative selection by the selection circuit 15 is equivalent to equation (1) in which either one of two weight coefficients ω1 and ω2 to be "1" and the other to be "0". Accordingly, the selection circuit 15 is formed so as to inform the decoder side which prediction processing is selected, by outputting the weight coefficient information data D4.

The quantization circuit 16 quantizes the selected upper hierarchical image data D2 and the predictive residue data Rs, or the motion vector MV and the predictive residue data Rt according to the fixed or adaptive quantization step width and supplies the resultant quantization data D5 (the quantization result of the upper hierarchical image data D2 or the quantization result of the motion vector MV) and D6 (the quantization result of the predictive residue data Rs or Rt) to a variable length coding circuit (VLC) 17. The variable length coding circuit 17 allocates the shorter code to the one having the more higher probability of occurrence on the quantization data D5 and D6. At this point, since the predictive residue data Rs (or Rt) is centered around in the neighborhood of "0", the occurrence information volume of the variable length coding data D8 becomes very small.

The variable length coding data D7 and D8, and the weight coefficient information data D4 are transformed to the transmission data D9 suited for transmission on the transmission route by performing a processing such as a packetting processing by a transmission format converter 18. Then the transmission data D9 is output to the transmission route or the recording device.

Figure 4:
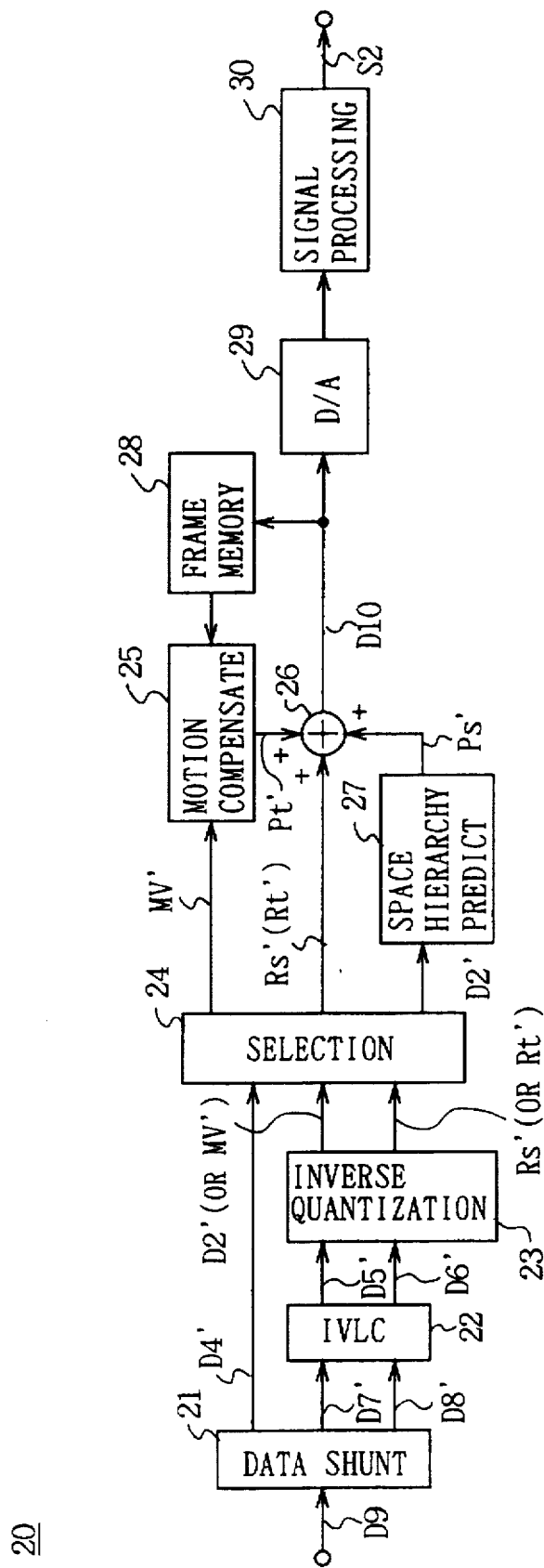
FIG. 4 is a block diagram showing the construction of a decoding device according to the first embodiment.

FIG. 4 shows the construction of a decoding device 20 which decodes the transmission data D9 compression coded by the coding device 1. The decoding device 20 inputs the transmission data D9 to be transmitted from the transmission route or the reproduction device to a data shunt circuit 21. The data shunt circuit 21 shunts the transmission data D9 into weight coefficient information data D4' and variable length coding data D7' and D8' referring to such as header information and outputs variable length coding data D7' and D8' to a variable length decoding circuit (IVLC) 22. Quantization data D5' and D6' obtained by the variable length decoding circuit 22 are inverse quantized by inverse-quantization circuit 23 respectively, thereby upper hierarchical image data D2' (or motion vector MV') and predictive residue data Rs' (or Rt') are restored.

A switcher 24 selectively distributes the upper hierarchical image data D2' and the predictive residue data Rs', or the motion vector MV' and the predictive residue data Rt' to the latter stage circuits with the weight coefficient information data D4' as a switch control signal. At this point, in the case where the weight coefficient information data D4' shows that the weight coefficient ω1 to be "1" and the weight coefficient ω2 to be "0", the motion vector MV' and the predictive residue data Rt based on the motion compensated prediction should be input to the switcher 24, and in this case, the motion vector MV' is output to the motion compensation circuit 25 and the predictive residue data Rt' is output to the adder 26.

On the other hand, if the weight coefficient information data D4' shows that the weight coefficient ω1 to be "0" and the weight coefficient ω2 to be "1", the upper hierarchical image data D2' and the predictive residue data Rs based on the space hierarchical direction prediction should be input to the switcher 24, and in this case, the upper hierarchical image data D2' is output to the space hierarchical prediction circuit 27, the predictive residue data Rs' is output to the adder 26. In this connection, the relationship of weight coefficients ω1 and ω2 is ω1+ω2=1; and accordingly, since if one weight coefficient exists, the other weight coefficient can be easily obtained, in practice, the coding device 1 transmits only one weight coefficient as the weight coefficient information data D4.

The space hierarchical prediction circuit 27 is formed by the same construction as the space hierarchical prediction circuit 8 of the coding device 1, and predicts the lower hierarchical image data on the basis of the upper hierarchical image data D2' inputted to output the prediction value Ps' to the adder 26. As a result, since the prediction value Ps' and the predictive residue data Rs' are added in the adder 26, the original lower hierarchical data is restored. The motion compensation circuit 25 is formed by the same construction as the motion compensation circuit 12 of the coding device 1, and obtains the prediction value Pt' by motion compensating for motion vector MV' on the previous frame image data read out from the frame memory 28 to output this to the adder 26. As a result, since the motion compensated prediction value Pt' and the predictive residue data Rt' are added in the adder 26, the original image data is restored.

The restored image data D10 is input to a signal processing circuit 30 through a digital-to-analog converter (D/A) 29. The signal processing circuit 30 forms a restored video signal S2 by performing the inverse processing to the signal processing circuit 4 of the coding device 1.

According to the foregoing construction, the coding device 1 obtains the prediction value Pt according to the motion compensation and also obtains the predictive residue data Rt showing the difference between the prediction value Pt and the true value by the motion compensated prediction 2. Moreover, the coding device 1 obtains the prediction value Ps of the lower hierarchy pixel using the upper hierarchy pixel and also obtains the predictive residue data Rs showing the difference between the prediction value Ps and the true value by the space hierarchical direction prediction unit 3.

Then, the coding device 1 alternatively selects data which becomes an object of coding by comparing sizes of the predictive residue data Rt and Rs by the selector circuit 15. For example, since the predictive residue of the space hierarchical direction prediction is smaller than that of the motion compensated prediction at the plane part of an image, the space hierarchical direction prediction is selected. On the other hand, at the edge part of the image, the predictive residue of the motion compensated prediction is smaller than that of the space hierarchical direction prediction, the motion compensated prediction is selected.

If the space hierarchical direction prediction is selected, the predictive residue data Rs by the space hierarchical direction prediction and the upper hierarchical image data D2 become objects of coding, and if the motion compensated prediction is selected, the predictive residue data Rt by the motion compensation and the motion vector MV become objects of coding.

According to the foregoing construction, the input data D1 is predicted by means of two different prediction methods of motion compensated prediction and space hierarchical direction prediction, and one having smaller predictive residue is used as an object of coding. Thereby, the worsening of picture quality can be controlled in the predictive coding and simultaneously, the generating code volume can be decreased.

(2) Second Embodiment

Figure 5:
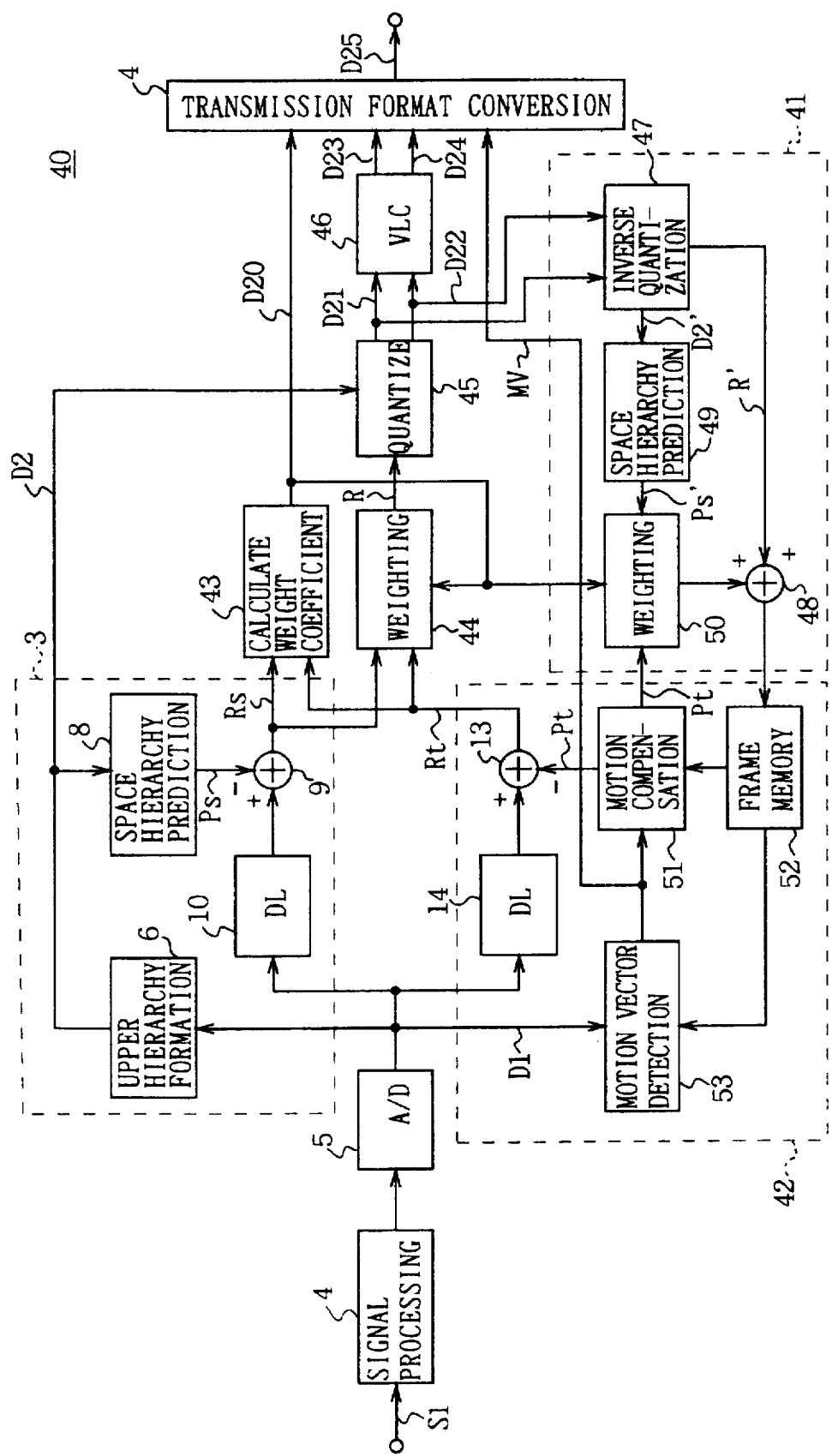
FIG. 5 is a block diagram showing the construction of a coding device according to the second embodiment.

In FIG. 5 where the same reference numerals are applied to parts corresponding to FIG. 3, 40 shows a coding device according to the second embodiment. The coding device 40 of this embodiment calculates the optimal weight coefficients ω1 and ω2 according to two predictive residue data Rt and Rs, and as shown in the following equation (6), by multiplying these calculated weight coefficient ω1 and ω2 by each predictive residue data Rt and Rs and combining these, the predictive residue data R is obtained and made as an object of coding.

$$R = \omega 1 \times Rt + \omega 2 \times Rs \quad (6)$$

And finally, the encoded predictive residue data R, the encoded upper hierarchical image data D2, the motion vector MV and the weight coefficient information data D20 are transmitted. With this arrangement, in the coding device 40, the prediction coding processing can be executed more accurately as compared with the case of first embodiment in which one of predictive residues is alternatively made as a coding object merely due to the size of predictive residue.

Furthermore, in the coding device 40, the data which has been once weighted and quantized is used as a local decode, as a previous frame data to be used for the motion compensated prediction. With this arrangement, the motion compensated prediction can be performed on the decoding side taking decoding errors into consideration. Consequently, the coding device 40 has a local decoder unit 41.

More precisely, the coding device 40 supplies two predictive residue data Rs and Rt output from differential circuits 9 and 13 to the weight coefficient calculation circuit 43. The weight coefficient calculation circuit 43 obtains the weight coefficients ω1 and ω2 according to the proportional allotment shown by equations (2) and (3) using the predictive residue data Rs and Rt. That is, weight is proportionally distributed so that the smaller weight coefficient is given to the larger predictive residue while the larger weight coefficient is given to the smaller predictive residue.

The weight coefficient information data D20 obtained by the weight coefficient calculation circuit 43 is output to a weighting circuit 44. The weighting circuit 44 calculates the predictive residue data R in which 2 predictive residues are combined as shown in equation (6) using the weight coefficients ω1 and ω2 and outputs this to the quantization circuit 45.

Further, the upper hierarchical image data D2 has been input to the quantization circuit 45 in addition to the predictive residue data R, and by quantizing these with the fixed or adaptive quantization step width, the quantization circuit 45 forms quantization data D21 corresponding to the predictive residue data R and quantization data D22 corresponding to the upper hierarchical image data D2. The variable length coding circuit 46 forms variable length coding data D23 and D24 which correspond to the quantization data D21 and D22 respectively, by variable length coding the quantization data D21 and 22. The transmission format converter 18 forms transmission data D25 by performing a processing such as packetting processing to the motion vector MV and the weight coefficient information data D20.

At this point, the quantization data D21 and D22 are also supplied to an inverse quantization circuit 47 of the local decoder unit 41, and here predictive residue data R' and upper hierarchical image data D2' are restored and the predictive residue data R' is supplied to an adder 48 while the upper hierarchical image data D2' is supplied to a space hierarchy prediction circuit 49. The space hierarchy prediction circuit 49 which is formed by the same construction as the space hierarchy prediction circuit 8 obtains a prediction value Ps' of the lower hierarchy according to the space hierarchical direction prediction to output this to a weighting circuit 50.

In utilizing the prediction value Ps' supplied from the space hierarchy prediction circuit 40, the prediction value Pt supplied from a motion compensation circuit 51 and the weight coefficient information data D20 supplied from a weight coefficient calculation circuit 43, the weighting circuit 50 calculates the following equation (7) and supplies the calculation result to the adder 48.

$$\omega 1 \times Pt + \omega 2 \times Ps' \quad (7)$$

The predictive residue data R' to be supplied to the adder 48 can be expressed as following equation (8) with the true value of the lower hierarchy pixel as x.

$$R' = [\omega1(x - Pt) + \omega2(x - Ps)]'$$ (8)

$$= [x - \omega1 \times Pt - \omega2 \times Ps]'$$

$$(\because \omega1 + \omega2 = 1)$$

Therefore, in the adder 48, the following equation (9) is calculated, the pixel data obtained by the equation (9) is supplied to a frame memory 52.

$$(\omega1 \times Pt + \omega2 \times Ps') + (x - \omega1 \times Pt' - \omega2 \times Ps')$$ (9)

In the motion compensated prediction unit 42, the motion vector MV is obtained by the motion vector detection circuit 53 on the basis of the image data, considered the decoding error, stored in the frame memory 52 and the motion compensated prediction value Pt is obtained by the motion compensation circuit 51.

Figure 6:
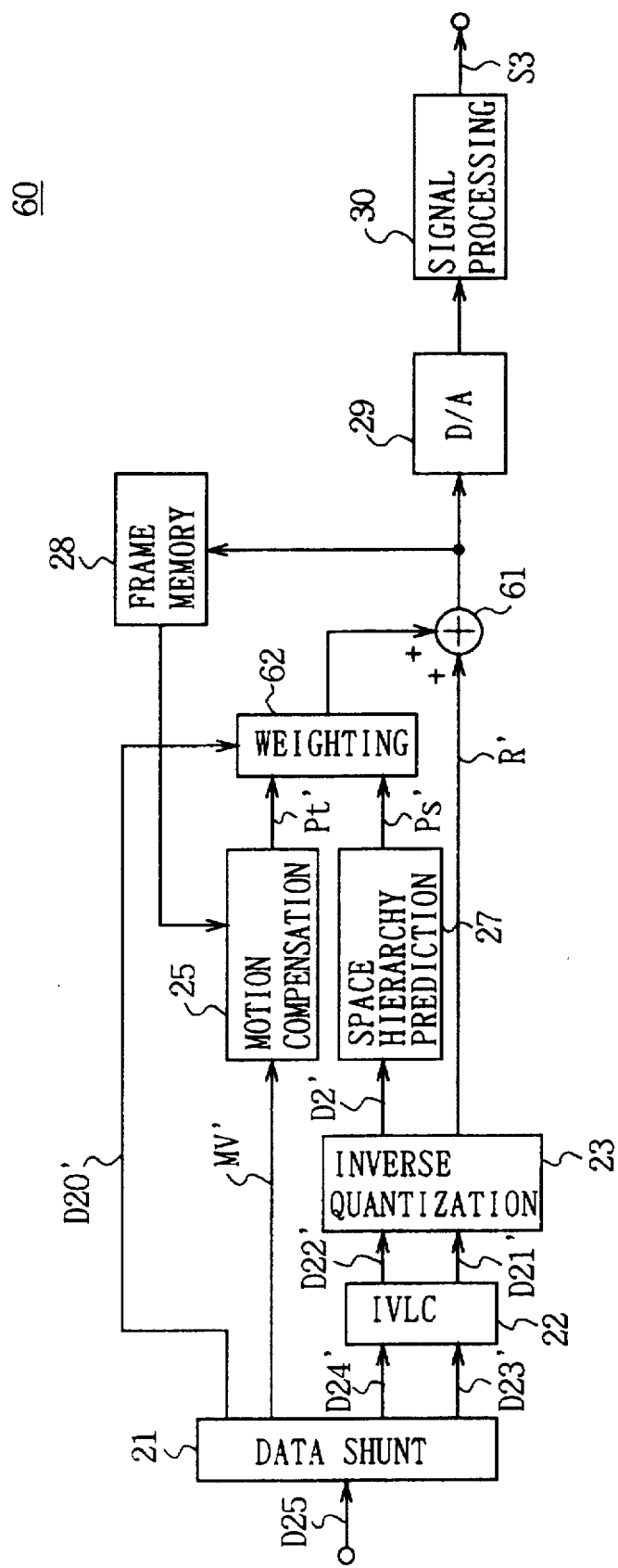
FIG. 6 is a block diagram showing the construction of a decoding device according to the second embodiment.

Then, the construction of a decoding device 60 for decoding the transmission data D25 compression-encoded by the coding device 40 will be described referring to FIG. 6. In FIG. 6 where the same reference numerals are applied to parts corresponding to FIG. 4, the decoding device 60 shunts the input transmission data D25 to the weight coefficient information data D20', the motion vector MV' and the variable length coding data D23' and D24' by a data shunting circuit 21.

The variable length coding data D23' and D24' are converted to quantization data D21' and D22' by a variable length decoding circuit 22, and the predictive residue data R' and the upper hierarchical image data D2' is restored by the following inverse quantization circuit 23. The space hierarchy prediction circuit 27 obtains the prediction value Ps' of the lower hierarchy from the upper hierarchical image data D2' to output this to a weighting circuit 62. Also the motion compensated prediction value Pt' obtained by the motion compensation circuit 25 is supplied to the weighting circuit 62.

The weighting circuit 62 calculates the following equation (10) by using the weight coefficient information data D20' in order to supply the calculation result to the adder 61.

$$\omega1 \times Pt' + \omega2 \times Ps'$$ (10)

In the adder 61, since the predictive error included in the output of the weighting circuit 62 is compensated by the predictive residue data R', the restored image data very close to the true value can be obtained. An addition result is converted into a restored video signal S3 through a digital-to-analog converter 29 and a signal processing circuit 30.

According to the foregoing construction, the weight coefficients are calculated based on the predictive residue by the motion compensated prediction and the predictive residue by the space hierarchical direction prediction, and two prediction results are weighted and coded by using the weight coefficients respectively. Therefore, further improved highly efficient prediction coding can be performed to the intermediate image between the edge image and the plane image for example.

(3) Third Embodiment

Figure 7:
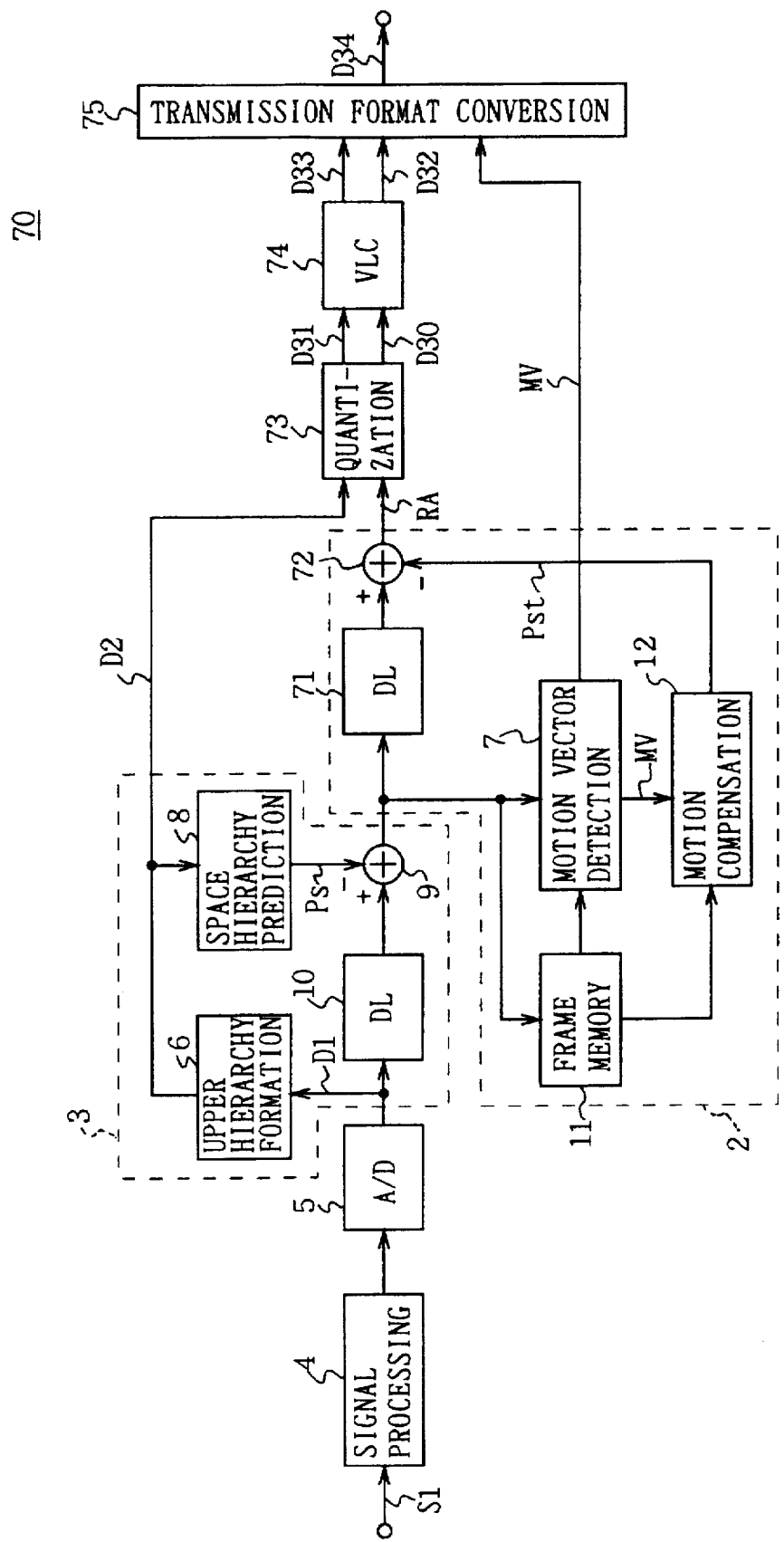
FIG. 7 is a block diagram showing the construction of a coding device according to the third embodiment.

In FIG. 7 where the same reference numerals are applied to parts corresponding to FIG. 3, 70 shows a coding device of the third embodiment as a whole, and a space hierarchical direction prediction unit 3 and a motion compensated prediction unit 2 are connected in series. The coding device 70 supplies the predictive residue data Rs formed by the space hierarchical direction prediction unit 3 to a differential circuit 72 through a delay circuit 71 by delaying for the processing time of the motion compensated prediction unit 2, and also supplies to the motion compensated prediction unit 2.

The motion compensated prediction unit 2 performs the motion compensated prediction by using the predictive residue data Rs. Thus, in the motion compensated prediction unit 2, predicted data Pst is formed in consideration of both the space hierarchical prediction and the motion compensated prediction and the predicted data Pst is supplied to a differential circuit 72. In the differential circuit 72, the difference between the predictive residue data Rs and the predicted data Pst is obtained and the differential data RA is supplied to a quantizer 73 as the final predictive residue data and an object of coding.

The quantizer 73 obtains quantized data D30 and D31 which correspond respectively to the predictive residue data RA and the upper hierarchical image data D2, and variable length coding data D32 and D33 based on the quantized data D30 and D31 is obtained by the following variable length coding circuit 74. A transmission format converter 75 forms transmission data D34 by using the variable length coding data D32 and D33 and the motion vector MV.

Figure 8:
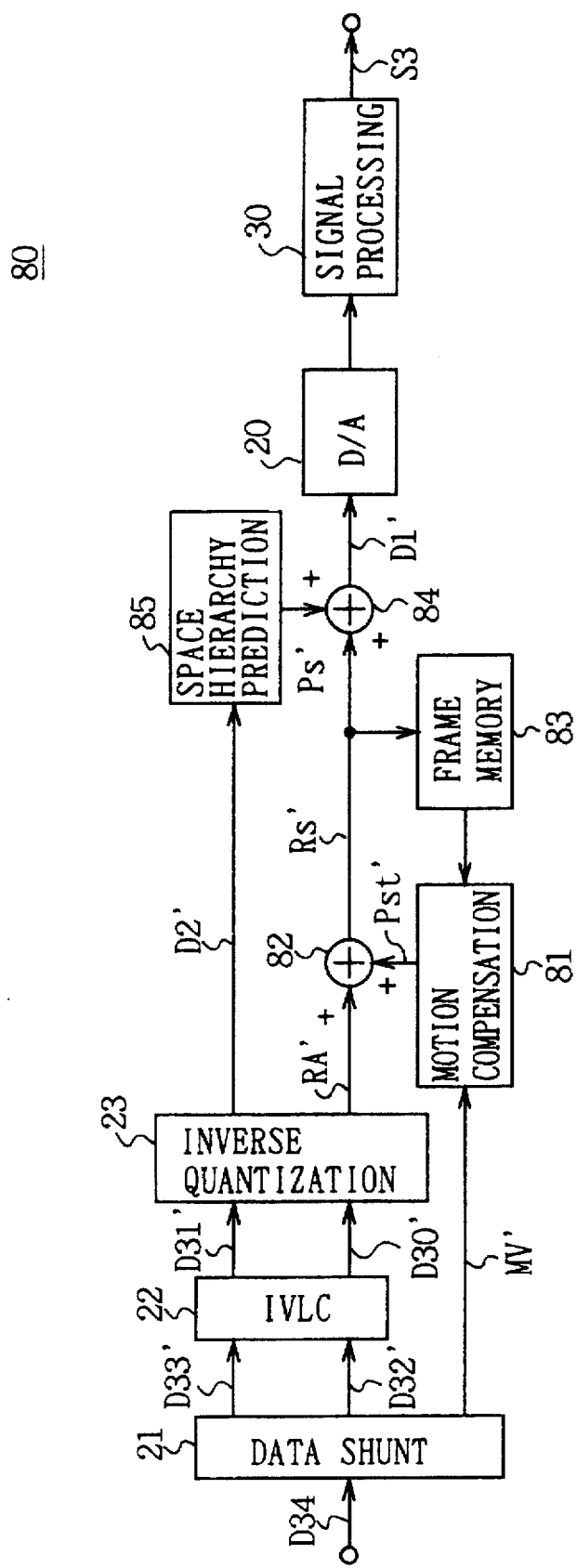
FIG. 8 is a block diagram showing the construction of a decoding device according to the third embodiment.

FIG. 8 shows the construction of a decoding device 80 for decoding the transmission data D34 formed by the coding device 70. In FIG. 8 where the same reference numerals are applied to parts corresponding to FIG. 4, the decoding device 80 shunts the input transmission data D34 to variable coding data D32' and D33' and motion vector MV' by a data shunting circuit 21. Then the variable length coding data D32' and D33' become to the quantized data D30' and D31' respectively by a variable length decoding device 22, further, since the quantized data D30' and D31' are inverse-quantized by an inverse quantizer 23, the predictive residue data RA' and the upper hierarchical image data D2' are restored.

The predictive residue data RA is supplied to an adder 82. Moreover, the predicted data Pst obtained by a motion compensation circuit 81 based on the motion vector MV is supplied to the adder 82. As a result, in the adder 82, the predictive residue data Rs according to the space hierarchical direction prediction is calculated and supplied to an adder 84. Also, the lower hierarchical prediction data Ps' obtained by a space hierarchical prediction circuit 85 is supplied to the adder 84 and as a result, restored image data D1' corresponding to the input image data D1 can be obtained in the adder 84. Then, the restored image data D1 becomes restored video signal S3 through a digital-to-analog converter 20 and a signal processing circuit 30.

(4) Fourth Embodiment

Figure 9:
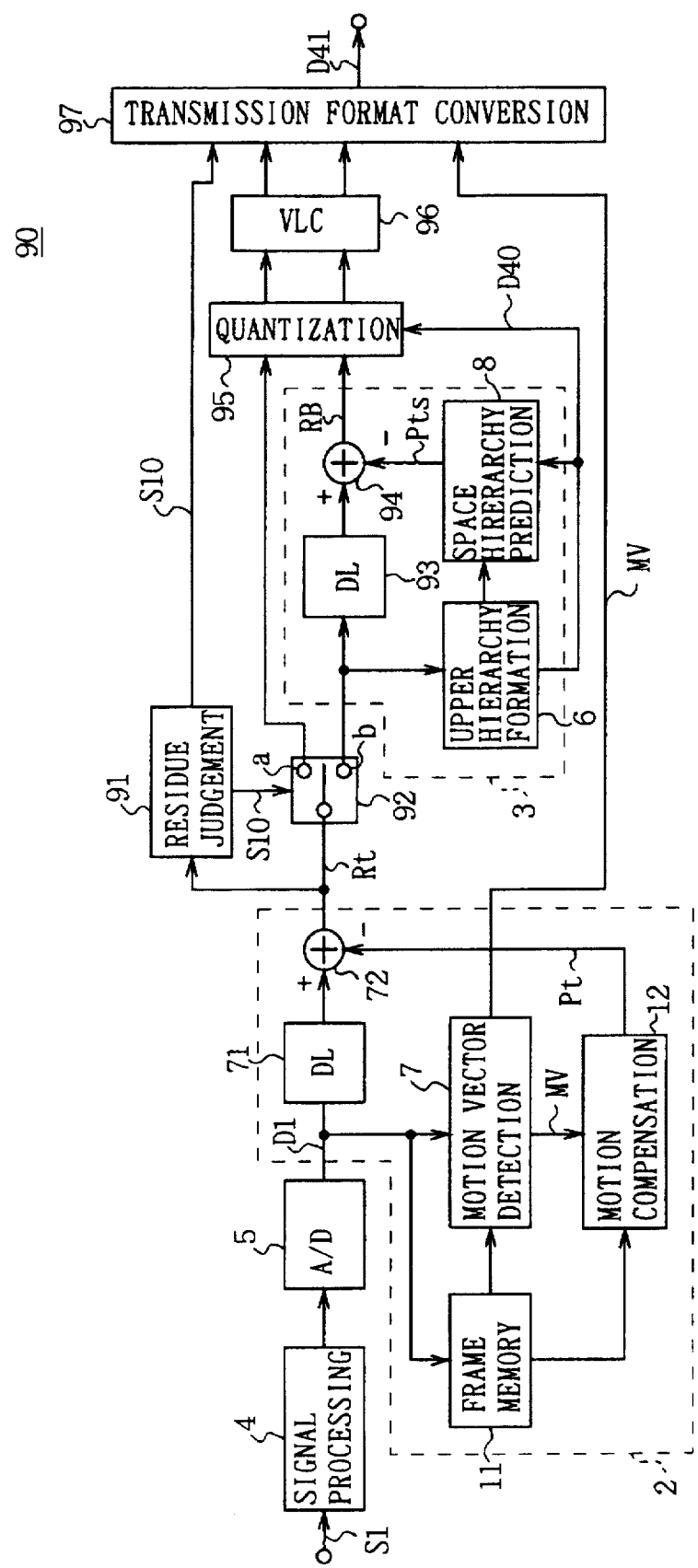
FIG. 9 is a block diagram showing the construction of a coding device according to the fourth embodiment.

In FIG. 9 where the same reference numerals are applied to parts corresponding to FIG. 7, 90 shows a coding device according to the fourth embodiment as a whole. A different point between the coding device 90 and the coding device 70 is that in the coding device 70, the predictive residue is re-obtained at the next stage by using the predictive residue of the initial stage, while in the coding device 90, in the case where a certain degree of correct predictive residue is obtained at the initial stage, the prediction processing at the next stage is stopped. Thus, in the coding device 90, sufficiently accurate predictive coding processing can be performed without performing unnecessary predictive calculation. Moreover, in the coding device 90, the motion compensated prediction is executed at the first stage and then the space hierarchical prediction is executed at the following stage.

The coding device 90 outputs the predictive residue data Rt obtainedby the motion compensated prediction unit 2 to a residue judging circuit 91 and a switch circuit 92. The residue judging circuit 91 compares the predictive residue data Rt with the fixed threshold, and in the case where the predictive residue data Rt is lower than the threshold, the switch circuit 92 is switch-controlled to the terminal "a", while in the case where the predictive residue data Rt exceeds the threshold, the switch circuit 92 is switch-controlled to the terminal "b". The residue judging circuit 91 executes this switch-control by outputting a threshold judging signal S10 to the switch circuit 92.

When the terminal "b" of the switch circuit 92 is selected, the predictive residue data Rt is supplied to an upper hierarchy forming circuit 6, and at this point, upper hierarchical data D40 based on the predictive residue data Rt is formed and the upper hierarchical data D40 is supplied to the space hierarchy prediction circuit 8. Thus, in the space hierarchy prediction circuit 8, prediction data Pts is formed in consideration of the motion compensated prediction and the space hierarchical prediction and the prediction data Pts is supplied to a differential circuit 94. In the differential circuit 94, the difference between the predictive residue data Rt and the prediction data Pts is obtained and the differential data RB is output to a quantizer 95 as the final predictive residue data and a object of coding.

In the case where the terminal "a" of the switch circuit 92 is selected, Since only predictive residue data Rt is input to the quantizer 95 and variable length coding circuit 96, the predictive residue data Rt is successively quantized and variable length coded to output to a transmission format converter 97. On the other hand, when the terminal "b" of the switch circuit 92 is selected, since the predictive residue data RB and the upper hierarchical data D40 is input to the quantizer 95 and the variable length coding circuit 96, the data RB and D40 are successively quantized and variable length coded to output to the transmission format converter 97. The transmission format converter 97 forms the transmission data D40 from the output of the variable length coding circuit 96, the motion vector MV and the threshold judging signal S10.

Figure 10:
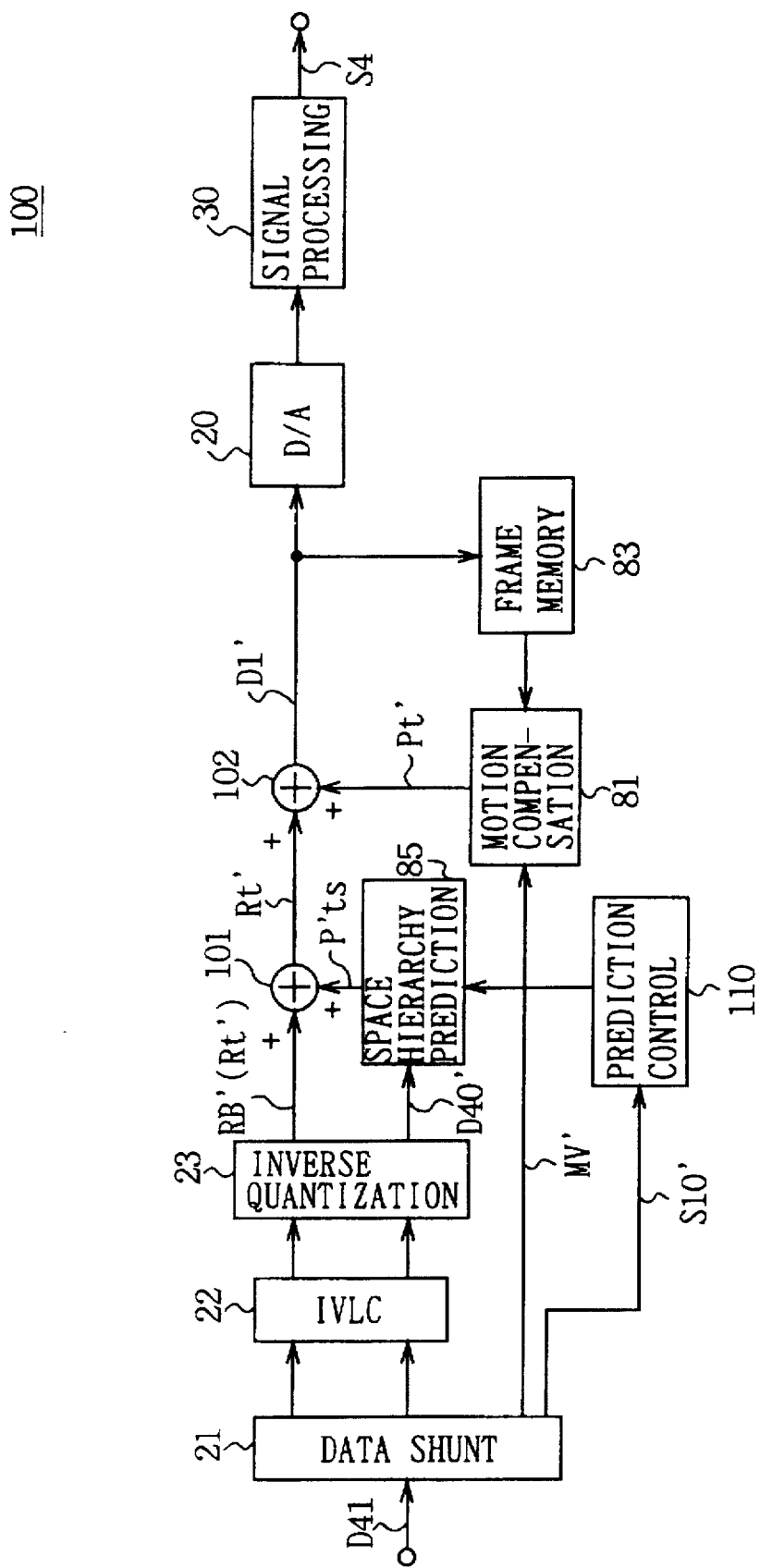
FIG. 10 is a block diagram showing the construction of a decoding device according to the fourth embodiment.

FIG. 10 where the same reference numerals applied to parts corresponding to FIG. 8 shows the construction of a decoding device 100 for decoding the transmission data D40 formed by the coding device 90. At the time when the terminal b of the switch circuit 92 is selected in the coding device 90 and transmission data D41 based on the predictive residue data RB, the upper hierarchical data D40 and the motion vector MV is inputted, the decoding device 100 supplies the restored data D41 to an adder 101, a space hierarchical prediction circuit 85 and a motion compensation circuit 81.

The transmitted threshold judging signal S10' is given to a prediction control circuit 110. In the case where the threshold judging signal S10' shows that the terminal "b" of the switch circuit 92 is switch-controlled, the prediction control circuit 110 makes the space hierarchical prediction circuit 85 to on operate, while in the case where the threshold judging signal S10' shows that the terminal "a" of the switch circuit 92 is switch-controlled, the prediction control circuit 110 makes the space hierarchical prediction circuit 85 to off operate.

Since the predictive residue data RB' and the predicted data Pts' are added in the adder 101, the predictive residue data Rt' is obtained. Moreover, in an adder 102, the restored image data D1' corresponding to the input image data D1 can be obtained by adding the predictive residue data Rt' and the predicted data Pt'.

On the other hand, at the time when the terminal "a" of the switch circuit 92 is selected in the coding device 90 and transmission data D41 based on the predictive error data Rt and the motion vector MV is inputted, the decoding device 100 continues the decoding processing with the space hierarchical prediction circuit 85 as the off condition. More specifically, the predictive residue data Rt' output from the inverse quantizer 23 passes through the adder 101 as it is and arrives the adder 102. And in the adder 102, it is added to the prediction data Pt' formed by the motion compensation circuit 81, thus the restored image data D1 is obtained.

(5) Other Embodiments

While in the aforesaid embodiment, coding devices 1, 40, 70 and 90 execute only predictive coding process, however, the present invention is not limited thereto and compressibility can be further increased by combining the transform coding such as Discrete Cosine Transform (DCT). Further, while in the aforesaid embodiment, the variable length coding is executed after quantization. However, the variable length coding circuit can be omitted by using such as a quantization circuit and an Adaptive Dynamic Range Coding (ADRC) circuit.

Further, while in the aforesaid embodiment, three neighboring pixels of the upper hierarchy are used as shown in equation (5) in the case of executing the prediction of the space hierarchical direction, the present invention is not limited thereto and one pixel, two pixels, or more than four pixels can be used. Furthermore, while in the aforesaid embodiment, the block matching method is used as a method for detecting the motion vector, however, the present invention is not limited thereto and the motion vector can be obtained by such as a gradient method and various motion vector detection methods can be applied.

While in the aforesaid third embodiment, the space hierarchical direction prediction is executed at the first stage and the motion compensated prediction is executed at the next stage, however, the present invention is not limited thereto and the motion compensated prediction can be executed at the first stage and the space hierarchical direction prediction can be executed at the next stage. Similarly, while in the aforesaid fourth embodiment, the motion compensated prediction is executed at the first stage and space hierarchical direction prediction is executed at the next stage selectively, however, the present invention is not limited thereto and the space hierarchical direction prediction can be executed at the first stage and the motion compensated prediction can be selectively executed at the next stage.

According to the present invention as described above, as well as conducting the motion compensated prediction, the predictive residue at this point is obtained, and in addition to the above, as well as conducting the prediction processing among hierarchical images by using hierarchical images, the predictive residue at this point is obtained. Then the predictive residue according to the motion compensated prediction and the predictive residue according to the intra-hierarchical prediction are adaptively selected or combined, and this selected or combined predictive residue is encoded. Thus digital video coding apparatus capable of decreasing the worsening of image quality as well as improving the image compressibility can be realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A digital video coding apparatus, comprising:

hierarchical image forming means for forming a second hierarchical video signal having lower resolution than a first hierarchical video signal based on said first hierarchical video signal;

hierarchy prediction means for predicting said first hierarchical video signal from said second hierarchical video signal;

hierarchy predictive residue calculating means for calculating a first predictive residue by obtaining the differential between said hierarchy predicted video signal and said first hierarchical video signal to be predicted;

motion vector detection means for detecting a motion vector between the current video signal and the video signal before one or "n" frames for said current video signal;

motion compensated prediction means for predicting said current video signal from the video signal of one or "n" frames before based on said motion vector;

motion compensated predictive residue calculating means for calculating the second predictive residue by obtaining the differential between said motion compensated predictive video signal and said current video signal to be predicted; and transmission means for transmitting the predictive residue, said second hierarchical video signal and/or said motion vector; wherein the predictive residue to be transmitted is obtained by adaptively combining said hierarchy prediction means and said hierarchy predictive residue calculating means, and said motion compensated prediction means and said motion compensated residue calculating means.

2. The digital video coding apparatus according to claim 1, comprising:

weight coefficient calculating means for obtaining the first and second weight coefficients ω1 and ω2 (where ω1+ω2=constant) on said first and second predictive residues based on said first and second predictive residue values respectively; and weighting means for combining by weighting said first and second predictive residues according to said first and second weight coefficients; wherein said transmission means transmits the combined predictive residue, said second hierarchical video signal and/or said motion vector, and at least one of said first and second weight coefficients.

3. The digital video coding apparatus according to claim 2, wherein:

said weight coefficient calculating means, wherein
the sizes of said first and second predictive residues are compared, and the weight coefficient on the smaller predictive residue is selected to be "1" and the weight coefficient on the larger predictive residue is selected to be "0"; and said transmission means, wherein
said second hierarchical video signal is transmitted without transmitting said motion vector in the case where said first predictive residue is smaller, and said motion vector is transmitted without transmitting said second hierarchical video signal in the case where said second predictive residue is smaller.

4. The digital video coding apparatus according to claim 1, wherein:

said hierarchy prediction means and said hierarchy predictive residue calculating means, and said motion compensated prediction means and said motion compensated predictive residue calculating means are connected in series;

the predictive residue is re-obtainedby the prediction means of the next stage, using the predictive residue obtained by the prediction means of the first stage; and said re-obtained predictive residue, said second hierarchical video signal and said motion vector are to be transmitted.

5. The digital video coding apparatus according to claim 1, wherein:

said hierarchy prediction means and said hierarchy predictive residue calculating means, and said motion compensated prediction means and said motion compensated predictive residue calculating means are connected in series;

binary threshold judgment is executed on the predictive residue obtainedby the prediction means of the first stage;

the predictive residue is re-obtained by the prediction means of the next stage using the predictive residue which is obtained by the prediction means of the first stage in the case where said predictive residue exceeds the threshold; and the prediction processing by the prediction means of the next stage is stopped in the case where said predictive residue does not exceed the threshold.

6. A digital video signal coding method, comprising the steps of:

forming the second hierarchical video signal having lower resolution than said first hierarchical video signal based on said first hierarchical video signal;

predicting said first hierarchical video signal from said second hierarchical video signal;

calculating the first predictive residue by obtaining the differential between said hierarchy predicted video signal and said first hierarchical video signal to be predicted;

detecting a motion vector between the current video signal and the video signal of one or "n" frames before said current video signal;

motion-compensation-predicting said current video signal from said video signal of one or "n" frames before based on said motion vector;

calculating the second predictive residue by obtaining the differential between said motion compensation predicted video signal and the current video signal to be predicted; and transmitting the predictive residue, said second hierarchical video signal and/or said motion vector; wherein said predictive residue to be transmitted is obtained by executing said hierarchy prediction step and said hierarchy predictive residue calculating step, and said motion compensated prediction step and said motion compensation predictive residue calculating step in parallel or in series.

7. The digital video signal coding method according to claim 6, comprising the steps of:

obtaining the first and the second weight coefficients ω1 and ω2 (where, ω1+ω2=constant) on said first and second predictive residues respectively based on the first and second predictive residue values; and combining by weighting said first and second predictive residues by said first and second weight coefficients; wherein said transmission step transmits the combined predictive residue, said second hierarchical video signal and/or said motion vector, and at least one of said first and second weight coefficients.

8. The digital video signal coding method according to claim 6, wherein:

said weight calculating step wherein
the sizes of said first and the second predictive residues are compared and the weight coefficient having smaller predictive residue is selected to be "1", the weight coefficient having larger predictive residue is selected to be "0"; and said transmission step wherein
said second hierarchical video signal is transmitted without transmitting said motion vector in the case where the first predictive residue is smaller, said motion vector is transmitted without transmitting said second hierarchical video signal in the case where the second predictive residue is smaller.

9. The digital video signal coding method according to claim 6, wherein:

the prediction processing by said hierarchy prediction step and said hierarchy predictive residue calculating step, and the prediction processing by said motion compensated prediction step and said motion compensated predictive residue calculating step are executed in series;

the predictive residue is re-obtained based on the next prediction processing using the predictive residue obtained by the first prediction process; and said re-obtained predictive residue, said second hierarchical video signal and said motion vector are transmitted.

10. The digital video signal coding method according to claim 6, wherein:

the prediction processing by said hierarchy prediction step and said hierarchy predictive residue calculating step, and the prediction processing by said motion compensated prediction step and said motion compensated predictive residue calculating step are executed in series;

the binary threshold judgment is executed on the predictive residue obtained by said first prediction process;

the predictive residue is re-obtained using the predictive residue obtainedby the first prediction processing based on the next prediction processing and transmitted in the case where said predictive residue exceeds the threshold; and the next prediction processing is stopped and the first predictive residue is transmitted in the case where said predictive residue does not exceed the threshold.

11. A coded video signal decoding apparatus, wherein:

a second hierarchical video signal having lower resolution than a first hierarchical video signal is formed;

the motion vector between the current video signal and the video signal one or "n" frames before said current video signal is detected;

the video signal corresponding to said first hierarchy is detected from said second hierarchical video signal;

the current video signal is motion-compensation-predicted from the video signal of one or "n" frames before based on said motion vector;

the second predictive residue is calculated by obtaining the differential between the motion compensation predicted video signal and the current video signal to be predicted, as well as the first predictive residue is calculated by obtaining differential between the hierarchy predicted video signal and the first hierarchical video signal to be predicted; and the coded video signal is decoded, said coded video signal being coded and transmitted by a digital video signal coding apparatus which transmits the predictive residues based on the first or second predictive residues, said second hierarchical and/or said motion vector, said coded image signal coding apparatus comprising:

hierarchy prediction means for predicting said first hierarchical video signal from said second hierarchical video signal transmitted;

motion compensated prediction means for predicting the current video signal based on the motion vector transmitted from said video signal of one or "n" frames before; and means for forming decoded video signal by adding the corresponding predictive residue transmitted to the prediction result obtained by said hierarchy prediction means and/or the prediction result obtained by said motion compensated prediction means.

12. A coded video signal decoding apparatus for decoding the coded video signal encoded and transmitted by the digital video coding apparatus according to claim 2, comprising:

hierarchy prediction means for predicting the first hierarchical video signal from the transmitted second hierarchical video signal;

motion compensated prediction means for predicting the current image based on the motion vector transmitted from the video signal one or "n" frames before;

means for weighting and adding said two prediction values by the weight coefficient corresponding to said transmitted weight coefficient signal; and means for forming the decoded video signal by adding the combined predictive residue transmitted to said weight added predicted value.

13. A coded video signal decoding apparatus for decoding the coded video signal encoded and transmitted by the digital video coding apparatus according to claim 3, comprising:

hierarchy prediction means for predicting the first hierarchical video signal from the transmitted second hierarchical video signal;

motion compensated prediction means for predicting the current video signal based on the motion vector transmitted from the video signal of one or "n" frames before;

selecting means for alternatively selecting said motion compensated prediction or said space hierarchy prediction according to said transmitted the weight coefficient value; and means for forming decoded video signal by adding said transmitted predictive residue to the prediction value obtained by the prediction means selected as above.

14. A coded video signal decoding apparatus for decoding the coded video signal encoded and transmitted by the digital video coding apparatus according to claim 4, comprising:

hierarchy prediction means for predicting the first hierarchical video signal from the transmitted second hierarchical video signal;

motion compensated prediction means for predicting the current video signal based on the motion vector transmitted from the video signal of one or "n" frames before; and means for forming the decoding video signal by adding the transmitted predictive residue signal to the double prediction video signal re-obtained by the other prediction means with regard to the predictive video signal obtainedby one of said prediction means.

15. A coded video signal decoding apparatus for decoding the coded video signal encoded and transmitted by the digital video coding apparatus according to claim 5, comprising:

hierarchy prediction means for predicting the first hierarchical video signal from the transmitted second hierarchical video signal;

motion compensated prediction means for predicting the current video signal based on the motion vector transmitted from the video signal of one or "n" frames before;

prediction controlling means for controlling whether one prediction out of said two predetermined prediction means is executed according to the threshold judging signal transmitted; and means for forming the decoded video signal by adding the predicted video signal obtained by the double prediction video signal re-obtained by the other prediction means on the predictive video signal obtained by said one of prediction means, or the predictive video signal obtained only by said other prediction means to said transmitted predictive residue signal transmitted.

16. A coded video signal decoding method wherein:

the second hierarchical video signal having lower resolution than the first hierarchical video signal is formed;

the motion vector between the current video signal and the video signal of one or "n" frames before said current video signal is detected;

the video signal which corresponds to the first hierarchy is hierarchy predicted from said second hierarchical video signal;

the current video signal is motion compensation predicted based on said motion vector from the video signal of one or "n" frames before;

the second predictive residue is calculated by obtaining the differential between the video signal which is motion compensation predicted and the video signal to be predicted, as well as the first predictive residue is calculated by obtaining the differential between the video signal hierarchy which is compensation predicted and the first hierarchical video signal to be predicted; and the coded video signal is decoded, said coded video signal being coded and transmitted by the digital video signal coding method which transmits the predictive residue based on said first and/or second predictive residues, said second hierarchical video signal and/or said motion vector, said coded video signal decoding apparatus comprising the steps of:

predicting said first hierarchical video signal from the transmitted second hierarchical video signal;

predicting the current video signal based on the motion vector transmitted from said video signal of one or "n" frames before; and forming decoded video signal by adding the corresponding predictive residue transmitted to the prediction result obtained at said hierarchical prediction step and/ or the prediction result obtained at said motion compensated prediction step.

17. A recording medium storing coded data which image is coded, which stores at least the coded data of:

predictive residue data which is obtained by combining a plurality of processing; and the second hierarchical image data having lower resolution than first hierarchical image data which is formed based on image data of first hierarchy and/or motion vector between the current video signal and the video signal of one or "n" frames before said current video signal; wherein said predictive residue data comprising:

first step of predicting said first hierarchical image data from said second hierarchical image data, and calculating first predictive residue by obtaining the differential between said hierarchical predicted video signal and first hierarchical video signal to be predicted; and second step of predicting said current video signal from said video signal of one or "n" frames before based on said motion vector, and calculating second predictive residue by obtaining the differential between said motion compensation predicted video signal and said current video signal to be predicted.

* * * * *